Nov. 11, 1969    M. BABUNOVIC ET AL    3,477,557

CONTAINER MOVING AND METERING APPARATUS

Filed May 26, 1967    5 Sheets-Sheet 1

INVENTORS:
MOMIR BABUNOVIC
JOHN C. GOESSMANN
BY
Gravely, Lieder & Woodruff
ATTORNEYS INVENTORS
MOMIR BABUNOVIC
JOHN C. GOESSMANN
BY Gravely, Lieder & Woodruff
ATTORNEYS

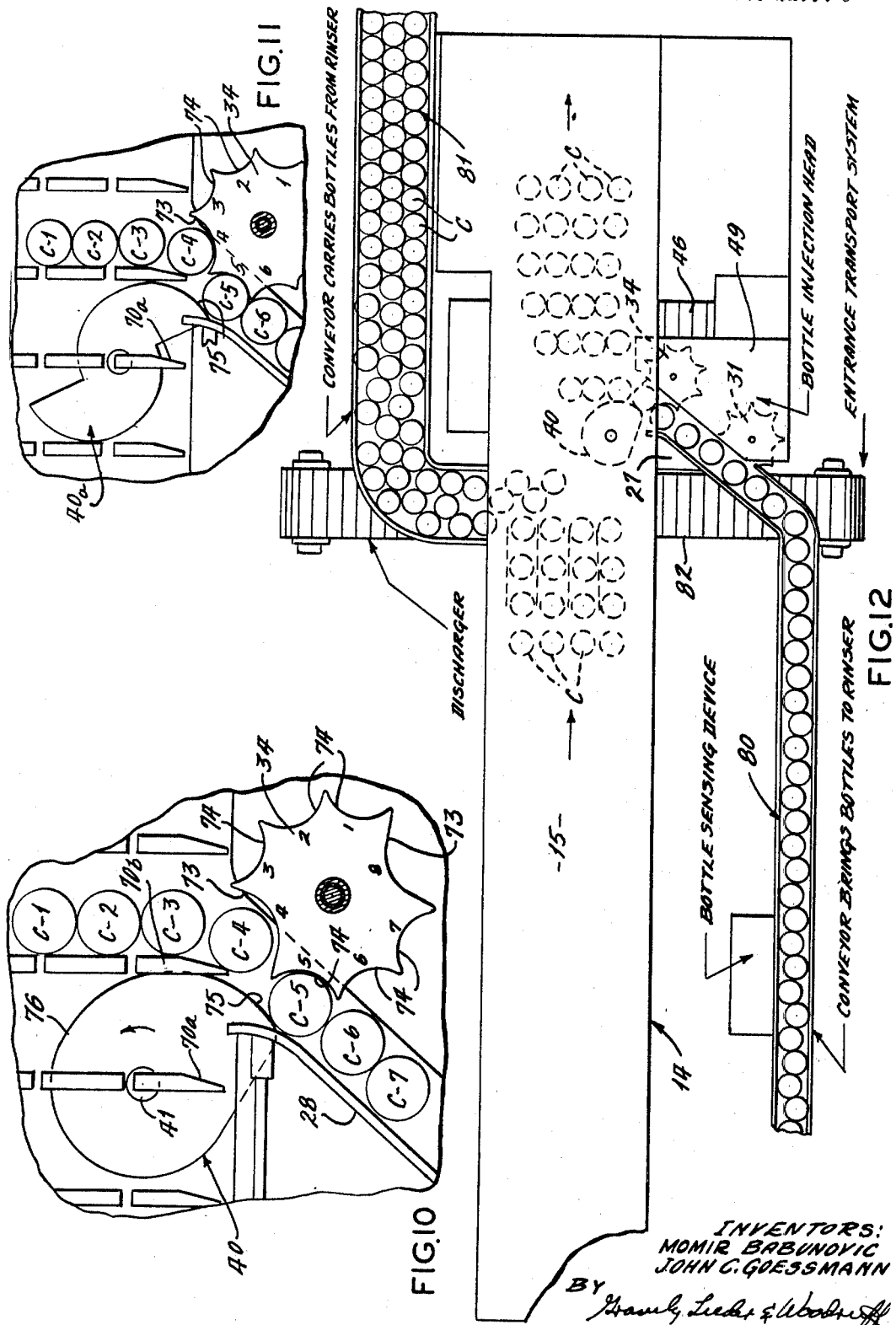

United States Patent Office 3,477,557
Patented Nov. 11, 1969

3,477,557
CONTAINER MOVING AND METERING
APPARATUS
Momir Babunovic and John C. Goessmann, St. Louis,
Mo., assignors to Barry-Wehmiller Company, St. Louis,
Mo., a corporation of Missouri
Filed May 26, 1967, Ser. No. 641,512
Int. Cl. B65g 47/52
U.S. Cl. 198—22                                       9 Claims

ABSTRACT OF THE DISCLOSURE

Apparatus for moving and metering the movement of containers into processing machinery, such as container rinsers, in multiple sequence such that a continuously moving pocketed conveyor may be constantly filled with containers through the action of a metering device which permits high speed handling.

---

This invention relates to novel and useful apparatus for feeding a metered number of containers into the pockets of a pocketed conveyor that is constantly driven.

An embodiment of this invention which has been selected for disclosure is a container rinser apparatus. The problem with containers is that they must be cleaned of carton dust and foreign matter before food products can be inserted. The need for a dependable, efficient and high speed container rinser is great in the food packaging industry. It is especially needed in the bottling of soft drinks, beer and similar fluid products where large numbers of bottles must be handled at high speed and with a minimum of breakage. Such apparatus must also be capable of handling a range of sizes or diameters of containers with minimum requirements for changes in the apparatus itself.

An important object of this invention is to provide high speed, high capacity, inexpensive, efficient and dependable container handling means for containers that require rinsing prior to filling.

It is another important object of this invention to provide container moving and metering apparatus for loading multiples of containers into the pockets of a continually moving conveyor so that stop-start operation may be avoided with consequent improvement in capacity.

A further object of this invention is to provide improved container moving and metering apparatus that is able to handle glass containers in large numbers without roughness and in a positive manner.

Other objects of this invention will become apparent in the following disclosure of one embodiment of apparatus suitable for container rinsers, reference being directed to the accompanying drawings, wherein:

FIG. 6 is a greatly enlarged and fragmentary sectional elevational view taken at line 6—6 in FIG. 4;

FIG. 7 is a perspective view of a typical container pocket unit for the apparatus seen in FIG. 2;

FIG. 8 is a fragmentary sectional view of the pocket units taken at line 8—8 in FIG. 4;

FIG. 9 is another fragmentary sectional view of the pocket unit when inserted during the pass thereof along the top of the apparatus seen in FIG. 2;

FIG. 10 is a greatly enlarged fragmentary plan view showing the operation of the container feed control cam means, the view being similar to FIG. 4;

FIG. 11 is a fragmentary view like FIG. 10 but showing a two-lobe feed control cam means; and FIG. 12 is a schematic plan view of another embodiment of the present apparatus.

Figure 1:
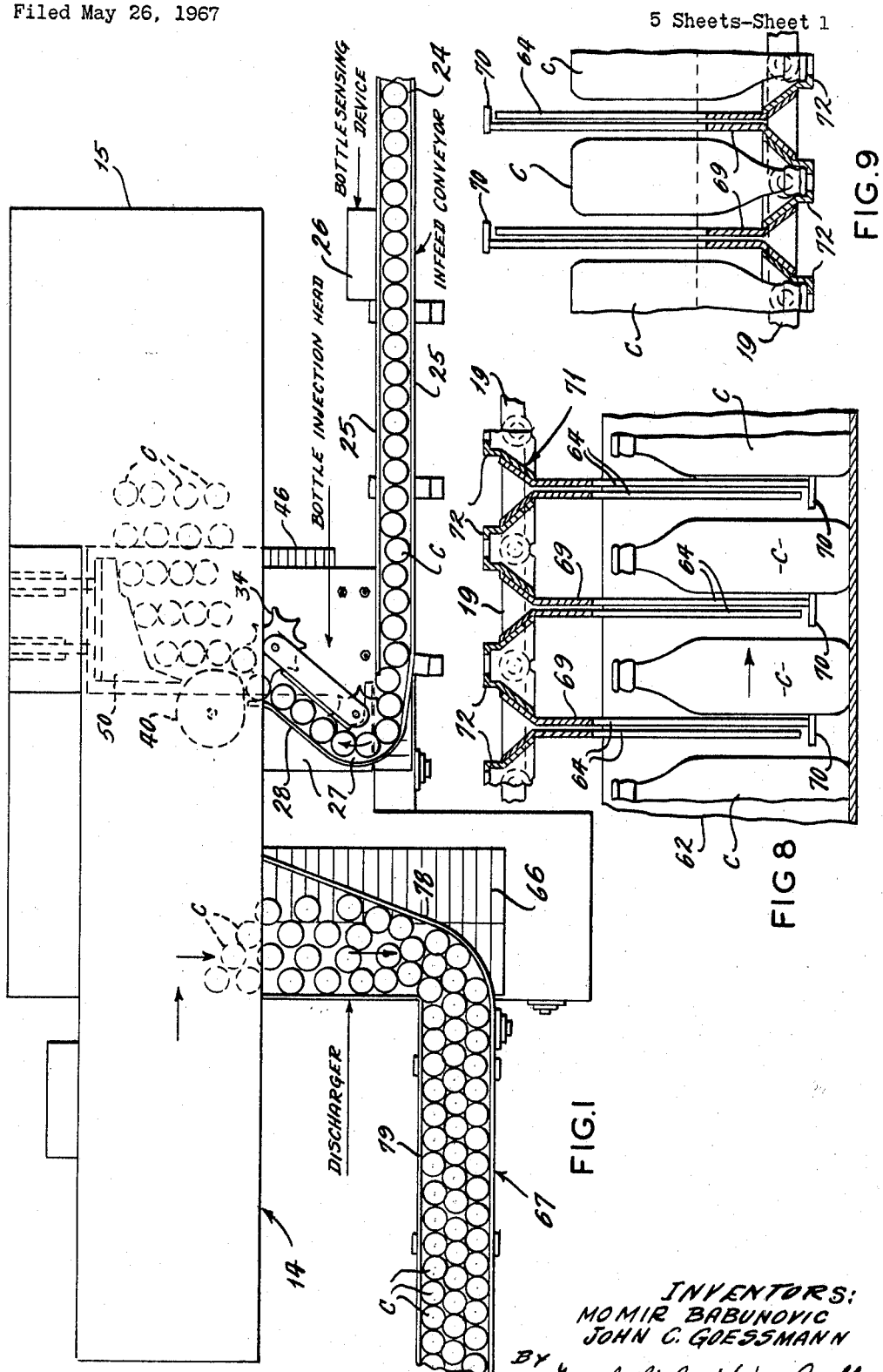
FIG. 1 is a schematic plan view of a preferred container rinser apparatus embodying the improvements of this invention.
Figure 2:
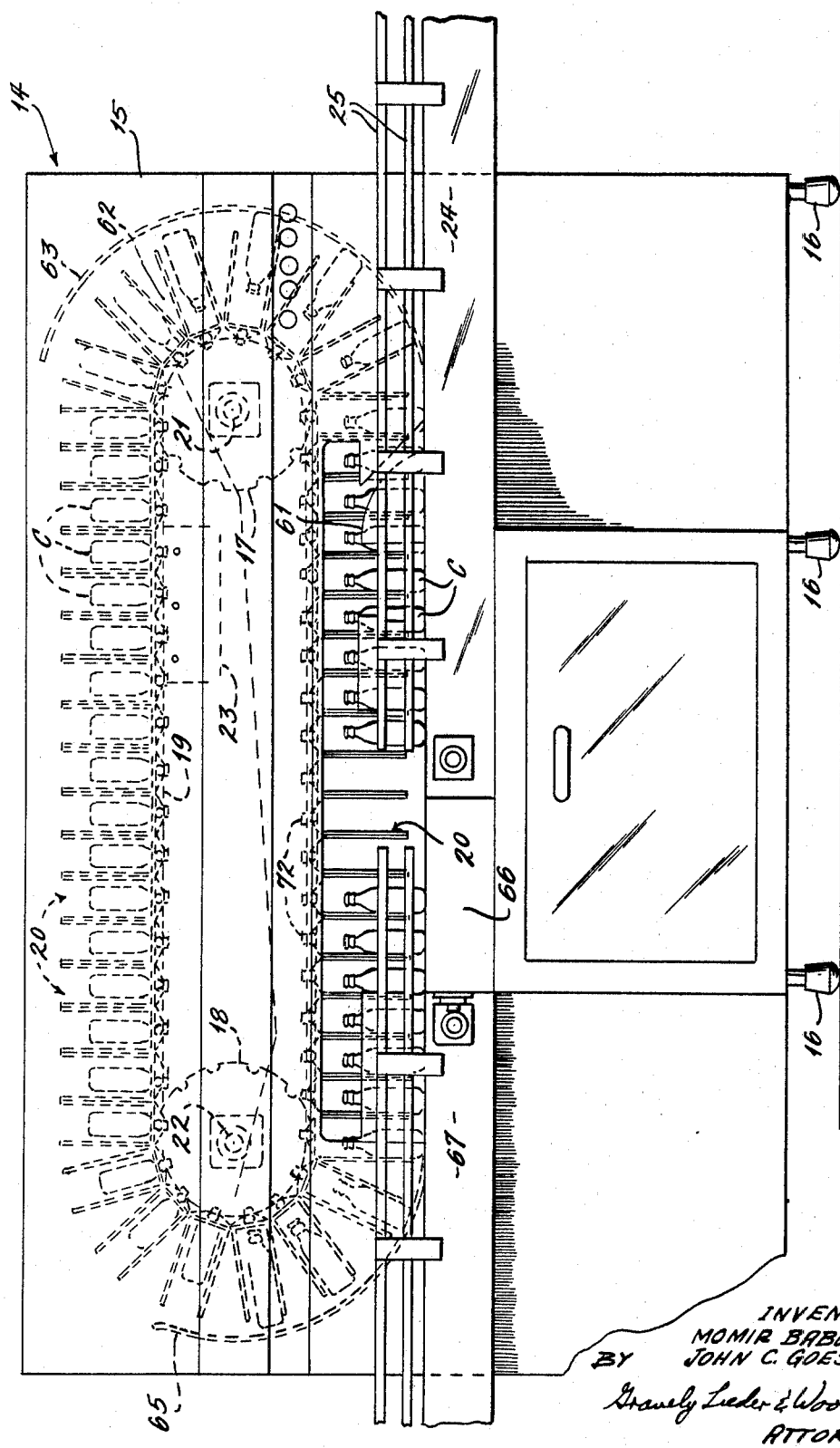
FIG. 2 is a fragmentary longitudinal side elevation view of the apparatus of FIG. 1.
Figure 3:
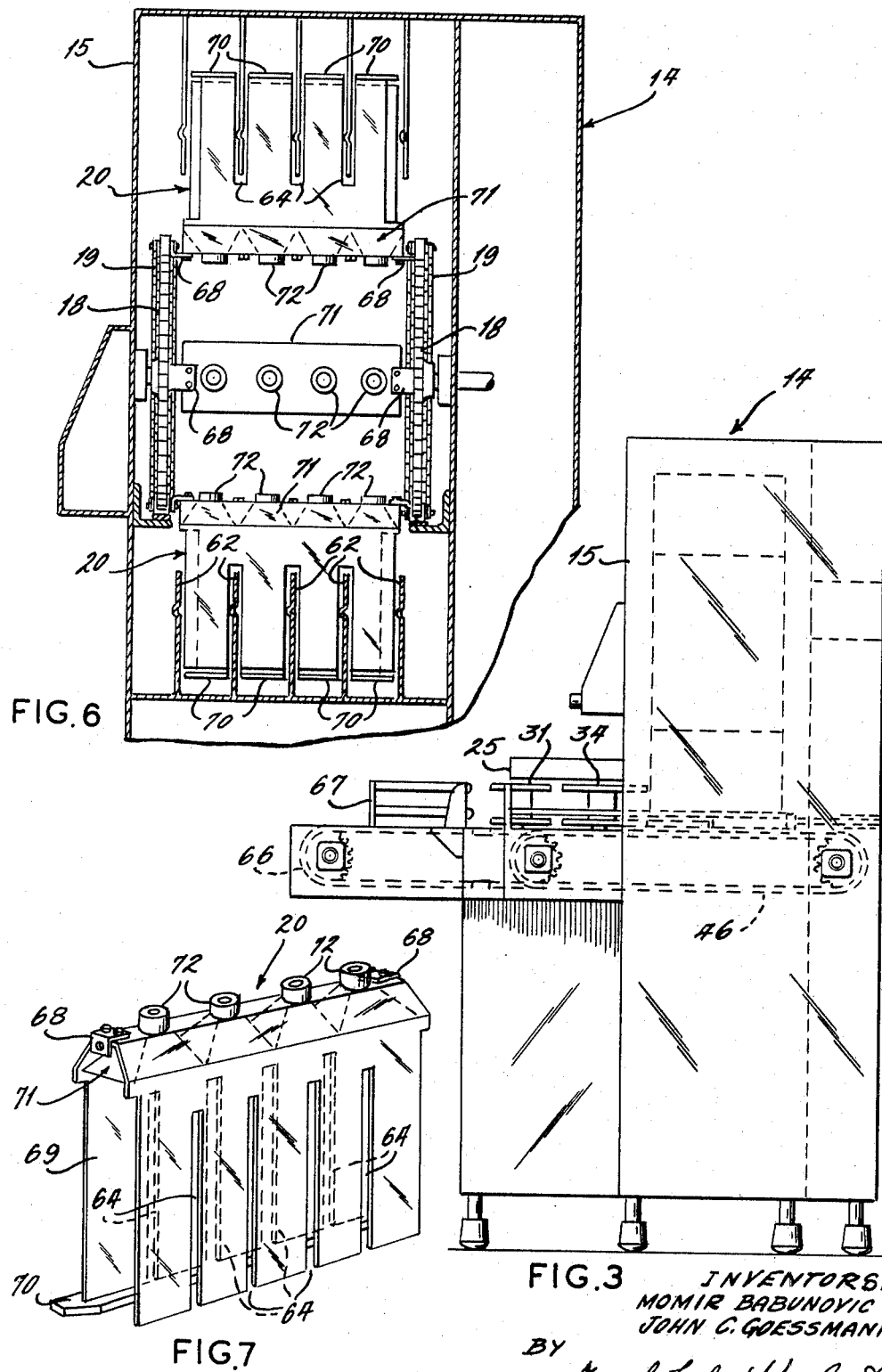
FIG. 3 is an end elevational view of the apparatus seen in FIGS. 1 and 2 from the right hand end thereof.

Reference will be directed to FIGS. 1, 2 and 3 where a preferred form of the present apparatus is shown. The container rinser apparatus 14 includes a suitable frame structure enclosed in sheet panels to provide a housing 15 which is supported on legs 16 resting on a floor surface. Within the housing 15 there are suitably mounted pairs of sprocket wheels 17 and 18 (FIG. 2) for operatively carrying and driving the endless pairs of sprocket chains 19 which support a plurality of container carrying pocket units 20. The pocket units 20 are open at the ends to receive the containers, and suitable drive means (not shown) is connected to the shaft 21 for the sprockets 17, sprockets 18 being mounted on idler shaft 22. The drive means may be mounted in the lower enclosure of housing 15, as is well understood, and the transmission of power may be by chain means (also not shown). Rinse fluid is jetted into the inverted containers C (FIG. 2) at a jet containing unit 23 which spans several rows of containers. The unit 23 may be all fluid jets or fluid and air jets in combination. After the containers C pass the jet unit 23 they are allowed to drain, if fluid jets are used, before reaching the idler sprockets 18 where they are again returned to a bottom-down position prior to being discharged.

In FIG. 1 the containers C are brought to the rinser apparatus 15 on an infeed conveyor 24 having side guides 25. A sensing device 26 is positioned adjacent the infeed conveyor 24 to stop the apparatus 14 when the supply of containers C is interrupted. The containers C are delivered by the infeed conveyor 24 onto a corner deadplate 27 where they are guided by the curved fence 28 supported by brackets 29 and 30. The curved fence 28 cooperates with driven starwheels 31 and 32 on vertical shaft 33. The top starwheel 31 is adapted to accommodate the shoulder region of containers and the bottom starwheel 32 adapts to the base of such containers. A suitable drive (not shown) is provided to actuate the shaft 33 so that the containers are propelled across the deadplate 27 in single file array and into the pocket units 20. The containers are next brought to injector cams 34 and 35 mounted on shaft 36 which is positively driven (chain or toothed belt) by means 37 engaged on wheels 38 and 39. The injector cams 34 and 35 cooperate with a guide cam 40 carried on shaft 41 driven by a set of gears 42, 43, 44 and 45 from shaft 33.

Figure 4:
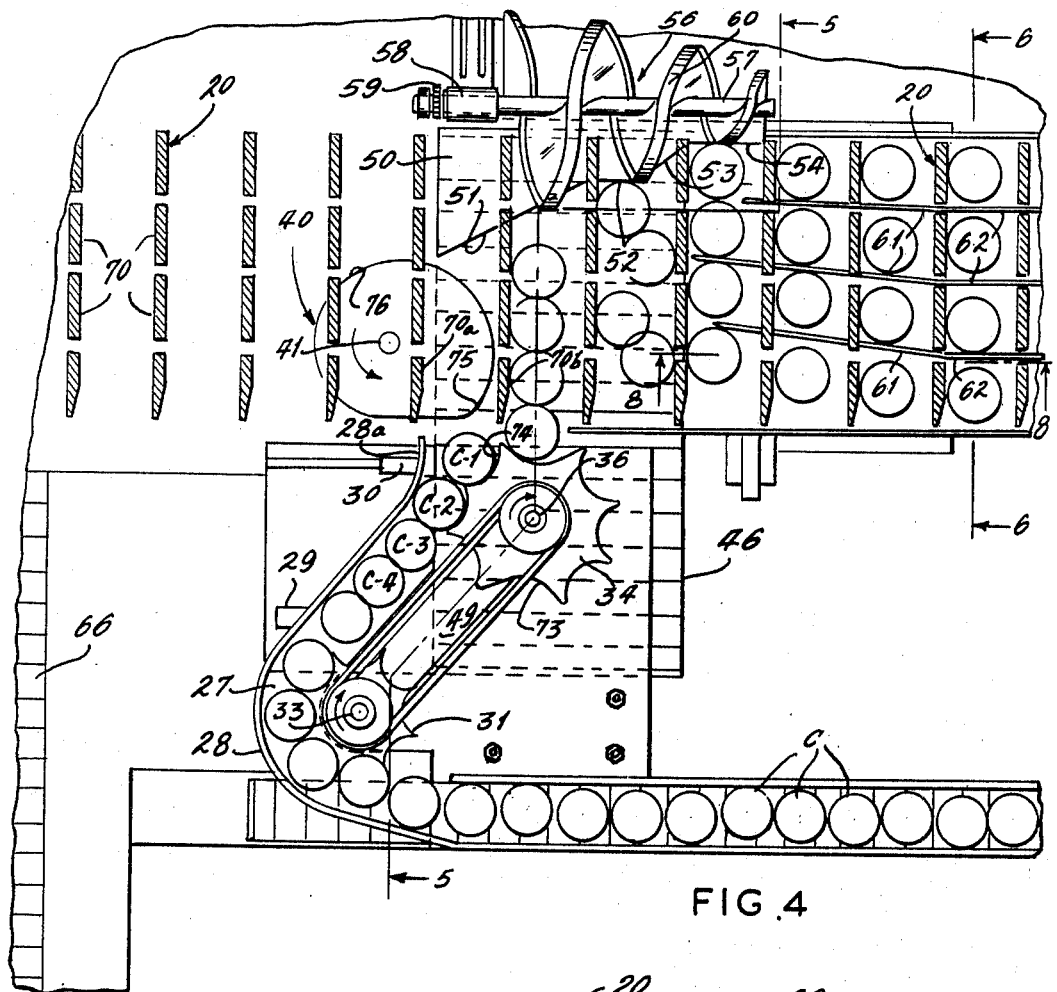
FIG. 4 is a greatly enlarged and fragmentary plan view of the container feeding section of the apparatus seen in FIG. 1.
Figure 5:
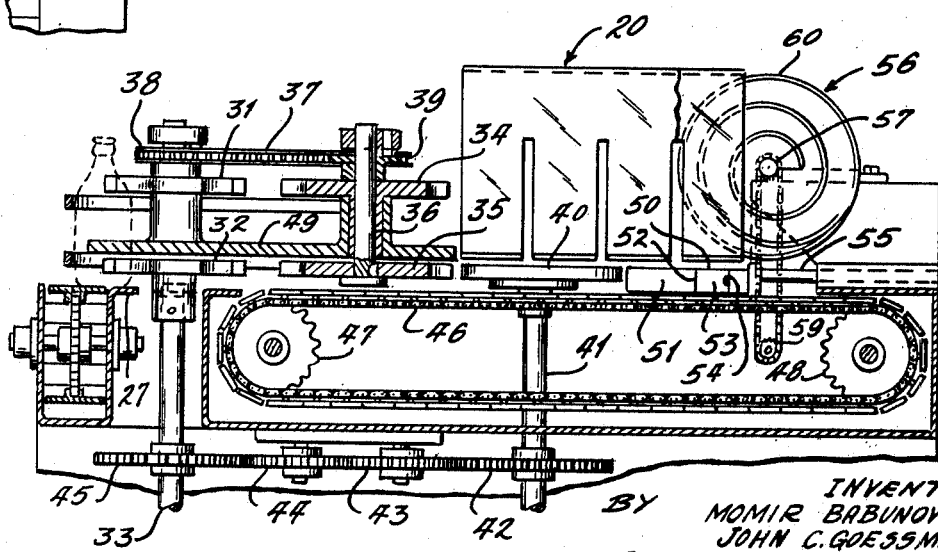
FIG. 5 is a transverse sectional elevational view taken at line 5—5 in FIG. 4.

Referring now to FIGS. 1, 4 and 5, it is seen that the containers C on approaching the injector cams 34 and 35 pass off of the deadplate 27 and onto the upper pass of a conveyor 46, the conveyor being supported on suitable sprockets 47 and 48 such that the upper horizontal pass of the conveyor moves below the injector cam 35. The starwheels 31 and 32 and the injector cams 34 and 35 are mounted as a sub-assembly on a common support 49 which can be easily removed from the driven shaft 33 and replaced with a similar assembly to take care of different sizes of containers. Therefore, the containers are moved by the conveyor 46 transversely of the normal line of travel of the pocket units 20 in the endless conveyor system in housing 15. The ends of the curved fences 28, however, maintain the travel of the containers so that the containers engage in the respective pockets or peripheral recesses in the injector cams 34 and 35. The conveyor 46 passes on across the travel of the pockets 20 and under the guide cam 40 so that there will be no interference from the mechanical assembly.

The travel of the containers past the guide cam 40 on the conveyor 46 is arrested by a fixed distribution return control guide 50 having an initial angular surface 51 which is oblique to the path of travel of the conveyor 46. The surface 51 connects with a short surface 52 and this, in turn, connects to an oblique surface 53, followed by a terminal surface 54. The control guide 50 is suitably supported by one or more bracket arms 55 at a position below the line of travel of the pockets 20 so that the respective surface 51, 52, 53 and 54 will be engaged by the base end portions of the containers C.

As is shown in FIGS. 4 and 5, the apparatus 14 is provided with a container position stabilizer worm means 56 which consists of a horizontally directed rotary shaft 57 supported in a suitable bearing 58 and is driven by chain 59 adjacent the bearing. The shaft 57 supports a spiral element 60 in which the flights thereof progressively increase from the outer end toward the support bearing 58. The pitch of the flights 60 is such that it will agree with the size of the carrier pockets 20 whereby upon suitable rotation the flights 60 will rotate into and out of the space between the pockets 20 and advance without mechanical interference. As seen in FIG. 5, the flights 60 are located so that the most inward surfaces between the pockets 20 will be engaged by containers at substantially the shoulder elevation. The combined function of the flights 60 and the control guide 50 is to prevent the containers from toppling sidewise within the pockets, and it is observed in FIG. 4 that the most inward reach of the respective turns on the flights 60 will agree substantially with the location of surfaces 51, 52 and 54 on the control guide 50. This will be the vertical alignment between the parts 50 and 60 for containers having substantially cylindrical body shape, but other shapes and configurations for the parts 50 and 60 can be employed to accommodate the shape characteristics of the containers being processed.

As the containers pass through the injection cams 34 and 35, as assisted by the guide cam 40, they are picked up in the respective conveyor pockets 20 while the containers are still being supported by the transfer conveyor 46. The combined actions of the conveyor 46 and the pockets 20 will be to move the groups of containers in each pocket into positions where the containers will come into alignment with spaces between low deflector guides 61. The alignment deflector guides 61 are below bars 70 and are fanned angularly to guide containers into properly spaced positions in each pocket so that the containers can be confined between other guides 62 as they are carried into the upward turn of the continually moving conveyor. The upward turn is defined by a curved wall 63 around which the pockets 20 pass, and the pockets are suitably formed with slits 64 so that there will be no interference with high wall guides 62. The opposite end of the pocketed conveyor is provided with a curved descent wall 65 around which the pockets 20 move so that the containers are gradually lowered onto the wall 65 and from there move down to a deadplate (not shown) which supports the containers until they reach a transversely moving conveyor 66 which will be traveling at a sufficient speed to move the containers sidewise out of the pockets 20 and onto a suitable discharge conveyor 67 (see FIGS. 1 and 2).

Looking at FIGS. 7, 8 and 9, it is appreciated that each of the pocket units 20 is connected by suitable brackets 68 to the conveyor chains 19 running around the sprockets 17 and 18. Each unit consists of a U-shaped wall structure 69 open at its opposite ends and having aligned through-slots 64 therein. As shown in FIGS. 7 and 8, the leading wall of each pocket unit 20 is shorter than the trailing wall, and each trailing wall is provided with a horizontally directed transport runner bar 70 which is interrupted by the through-slots 64 and therefore is shown as 4 separate segments in FIG. 4. The units 20 shown in FIGS. 7 and 8 are in the normal position for picking up and discharging containers, and the position shown in FIG. 9 would be that where the pocket units 20 move across the upper pass in the apparatus for retaining the containers in inverted, mouth down position. In order to locate the mouth of the containers properly each pocket unit is provided with an insert 71 that may be of molded shell construction so as to be provided with apertured ends 72 for catching and centering the containers when in the position shown in FIG. 9. It is not necessary for the ends 72 to hold the container in the vertical position shown in FIG. 9, but the container may lean to one side or the other without causing difficulty, so long as the container mouth has entered the opening in the end 72.

From an examination of FIGS. 4, 5, 7 and 8 it can be appreciated that the pocket units 20, moving at a uniform speed, will pass the zone defined by the transfer conveyor 46 and be loaded with a plurality of containers through the action of the injector cams 34 and 35 and the guide cam 40. The loaded pockets will then deliver the plurality of containers in a somewhat haphazard arrangement to the guide 61 where a precise arrangement of containers is achieved. The precise arrangement of containers in each pocket will be maintained for as long as it may be necessary beyond the zone of the jet unit 23. The runner bars 70 on each trailing wall of the pocket units 20 are adapted to engage the containers near the bottom ends thereof, and the runner bars are of sufficient width to prevent the containers engaging the vertical walls of the pocket units. These runner bars assist the smooth entrance of the containers into the respective pockets during the loading cycle in the zone defined by the transfer conveyor 46.

Attention will now be directed particularly to the disclosure in FIGS. 1, 4 and 10. These views illustrate the operation of the injector cams and guide cams. It will be observed that the starwheels 31 and 32 have regular or uniform sized recesses which correspond to the base and shoulder configurations of the containers. On the other hand, the injector cams 34 and 35 are characterized by diametrically opposed enlarged recesses 73 and two sets of substantially equal sized but shallower recesses 74. In this arrangement the injector cams 34 (and from here on the description will refer to only the top one of injector cams 34 and 35), are arranged to deliver four containers into each pocket unit 20. Any greater or lesser number would, of course, require a different cam configuration. The supply of containers is brought to the injector cam 34 in a single file order and is maintained by the fence 28 in position such that each container will engage deeply in the recess 73 or 74 of the injector cam. It must be remembered that the containers at this point rest on the transfer conveyor 46 and the tendency is for the containers to move rapidly out of the respective recesses in the injector cam. However, this tendency is opposed by the rotary guide cam 40 which in the view of FIGS. 4 and 10 has a single enlarged lobe 75 and a cam edge 76 of lesser prominence relative to the shaft 41 which represents the center of rotation. The guide cam 40 is timed so that its large lobe 75 will coincide with every fourth container and cause it to move in the direction of travel of pocket units 20, rather than solely in the direction of the transfer conveyor 46. The less prominent surface 76 of the guide cam 40 will function to maintain the three containers in advance of each fourth container in a state of transitional motion so that these containers will feed properly into the pocket units 20 in advance of the runner bars 70. It is, of course, appreciated that the above described cycle of events repeats itself consistently so long as containers are fed in an unbroken array through the starwheels 31 and 32 to the injector cams 34 and 35.

As is shown in FIG. 5, the shaft 33 for the starwheels 31 and 32 is driven from a suitable power source (not shown), and through the positive drive means 37 the injector cams 34 and 35 are also driven thereby. Within the sub-assembly on the support 49 it is noted that a gear train 42-45 is arranged to drive shaft 41 for the guide cam 40. The arrangement shown in FIG. 4 calls for synchronization of the injector cams 34 and 35 with the guide cam 40 on substantially a 1:2 basis.

Looking now at FIGS. 4 and 10, it can be appreciated in FIG. 4 that the start of injection of a plurality of containers is shown where containers C-1 is presented in injector cam recess 74 followed by container C-2 approaching its recess 74 and container C-3 and C-4 just beginning to approach a position where they will be supported by the transverse conveyor 46. The guide fence 28 is provided with a slightly curved portion 28a that will permit each of the containers to move across the direction of movement of the pocket units 20. It is appreciated that the entire group of containers C-1 to C-4 must complete the transition into the selected pocket unit 20 beween the time that the runner bars 70a shown over the guide cam 40, have moved to a position 70b so as to close off the entrance for containers. As the containers C-1, C-2, and C-3 are permitted to advance through the injector cams 34 and 35, the less prominent portions 76 of the guide cam 40 will be effective to constantly urge these containers to move obliquely relative to the linear path of movement of conveyor 46; which is to say, these containers will be caused to slide on the conveyor 46. This sliding action initiates the change of direction necessary for the containers in order to effect a smooth transition in movement from one direction on the conveyor 46 to movement at some angle thereto due to the different direction of movement of the pocket units 20. It can be appreciated that the runner bars 70a in advancing from left to right at some point (position about at 70b) will close off the possibility of an entrance space for containers.

It is for this reason that the injector cams 34 have a larger and somewhat deeper recess 73 which is positioned to receive the container C-4. When the container C-4 arrives in its recess 73 the large lobe 75 on the guide cam 40 will be timed to arrive at the transfer zone and force the container C-4 to remain for a longer period of time within the recess 73 so that the container C-4 will not be obstructed by the leading end of the runner bar 70a. This action is shown in FIG. 10 where the injector cam 34 is provided with recesses 74 that are of uniform configuration and are numbered 1, 2 and 3 to agree with the numbering of the containers C-1, C-2, and C-3. Recess 73, being larger, is designated by number 4. There follows then another group of uniform recesses 74 which are numbered 5, 6 and 7 to agree with the containers numbered C-5, C-6 and C-7. Container C-8 will eventually arrive in time to engage in the necessary enlarged recess 73, which is designated as number 8. The injector cam 34, therefore, is designed to inject containers seriatim into each successive conveyor pocket unit 20 with the assistance of the guide cam 40.

FIG. 11 shows a modified arrangement for transferring containers between two conveyors moving through a transfer zone in different directions. In this embodiment the guide cam 40 of FIG. 10 is replaced by a two lobe cam 40a mounted on the same drive shaft 41. In this case the guide cam 40a needs to be driven at only approximately one-half the rotary speed of cam 40. Such change in rotational speed can easily be made by suitably changing the train of gears 42-45 shown in FIG. 5.

Turning now to FIGS. 4 and 5 again, as each group of containers moves farther into the pocket units 20 control has to be exerted so that the containers do not tumble, but move easily with conveyor 46 and with great stability into the final position where the containers are isolated by deflector guide 61 and finally located in the pocket units 20 by guide means 62. In order to complete the transfer of the containers the apparatus includes the control guide means 50 and the position stabilizing worm means 56. These two means present a low and a high surface of engagement with the leading container, such as container C-1 in the example described in connection with FIG. 10. Container C-1, of course, is carried farther into its respective pocket unit 20 by the conveyor 46 and not necessarily by the following containers. This, then, causes the container C-1 to move along the oblique surface 51 of the control guide 50 and as it does so the rotary worm means 56 will constantly present a stabilizing surface 60 at approximately the shoulder height of the container (see FIG. 5). Since the worm means 56 is in the form of a tapered spiral its stabilizing surface 60 will move from left to right as viewed in FIG. 4 so as to substantially follow the various surfaces 51, 52, 53 and 54 and thereby advance at the proper linear speed to match the linear speed of the pocket units 20. The proper rotary speed is obtained through the drive 59 from a suitable power source (not shown). It is, of course, understood that any change in the linear speed of the pocket unit 20 will be accompanied by a corresponding change in the rotational speed of the worm means 56.

Looking again at FIG. 1, it will be understood that the transversely discharge conveyor 66 presents a surface beneath the pocket units 20 for the purpose of continually sweeping the containers out of these pockets. It will be noted that the containers emerge on the conveyor 66 in an oblique alignment until the guide fence 78, in cooperation with the opposed guide fence 79, causes the containers to crowd around the corner and onto the take away conveyor 67. The faster the conveyor operates for moving the pocket units 20 the more the containers being discharged will assume an alignment fairly oblique to the travel direction of the conveyor 66. As the speed of the pocket units 20 slows down the arrangement of containers in the discharge pattern will be at a lesser oblique angle to the direction of travel of the conveyor 66.

Turning now to FIG. 12, there is shown a modified apparatus in which the container supply conveyor 80 with the control sensing device 26 associated therewith brings the containers in on one side of the rinser apparatus 14 and the containers are taken away on a conveyor 81 from the opposite side of the apparatus. Certain advantages are obtained with this arrangement since a portion of the conveyor 82 can be arranged to move completely through the apparatus and act as the discharge conveyor for sweeping containers out of the pocket units 20 just prior to the pocket units being advanced into the transfer zone where a fresh group of containers may be injected by cams 34 and 40 in apparatus substantially like that shown in FIG. 4. It is, of course, understood that other arrangement of supply and discharge conveyors may be utilized with the apparatus 15.

In the present container handling apparatus the improvement disclosed can be seen to include a pair of container moving conveyors 20 and 46 which are directed to intersect one with the other in a container transfer zone. The pocket units 20 are associated with one of the conveyors in positions to accept containers brought to it by the other conveyor and so that the containers after being transferred can be quickly and smoothly removed from such zone. The improvement also includes the coordinated assembly of injector cams 34 and 35, guide cam 40 and control guide means 50 and rotary worm means 56 to properly inject a group of containers into the transfer zone and to simultaneously guide the injected containers during the transfer and transition in directions of travel. It is considered to be quite critical in feeding containers, such as breakable bottles, into processing apparatus such as the rinser described above, and to cause the feeding to occur in an unbroken flow and yet to achieve a definite separation between the last container of a leading group and the leading container of a following group. This critical action has been described in connection with FIGS. 4 and 10. It is also observed that the runner bars 70 carried on the trailing wall 69 of each pocket unit 20 assists in the smooth flow of containers into the respective pocket units. When this size containers are to be handled, the starwheel 32 and injector cam 34 assembly mounted on plate 49 can be bodily removed and replaced by similar means that will be properly sized for the new containers. It will not be necessary to make any changes in the pocket unit 20 or in the cams 40 or 40a, depending on which latter cam is employed.

The term "container" is used herein to encompass all forms and types of means for holding material, foods, and the like, where such means requires a preliminary processing step such as rinsing to remove packing case dirt, foreign material that might have accumulated, and the like. It is also understood that while the disclosure in FIGS. 4 and 10 relate to loading containers in groups of four, suitable variations in the physical structure can be easily made, now that the principles of the invention have been disclosed, so that larger or smaller groups of containers may be accommodated.

It is the aim herein to include all possible variations and equivalent means and apparatus within the spirit and scope of the following claims.

What is claimed is:

1. Container handling apparatus including a constantly moving first conveyor having a fixed path, container receiving pockets carried by said first conveyor, a constantly moving second conveyor having a path of movement directed to pass adjacent to and athwart said first conveyor below said pockets, means feeding containers seriatim onto said second conveyor, and means adjacent said two conveyors to regulate the transfer of the containers and to change the container movement from that of said second conveyor to that of said first conveyor, said transfer regulating means includes a rotary member engaging each container to maintain the seriatim order and a rotary guide between said first and second conveyors to engage each container and guide the same into said pockets while advancing the containers in the direction of said first conveyor.

2. The apparatus of claim 1 wherein said conveyor pockets carry container engaging means located by said pockets to pass adjacent said second conveyor, and said pockets pass adjacent said rotary member to cut-off container transfer upon receiving a predetermined number of containers.

3. The apparatus of claim 1 wherein said rotary member is a star wheel having a series of container receiving recesses in its periphery, said recesses being arranged in groups corresponding to the number of containers to be transferred to each pocket.

4. In a container handling apparatus the improvement including: a pair of container moving conveyors constantly moving directed to intersect one with the other in a container transfer zone; first means in said transfer zone associated with one of said container moving conveyors to accept containers from the other of said conveyors and remove the containers from the transfer zone; and other means in said transfer zone associated with both conveyors to inject containers into said transfer zone and simultaneously guide the injected containers in effecting transfer of direction of travel between said conveyors, said other means including a rotary peripherally recessed member to space the containers for entry into said transfer zone, and an adjacent rotary member to engage each container as it emerges from said recessed member, said recessed member being formed with at least a pair of diametrically opposite enlarged recesses and intervening recesses of less size, and said adjacent rotary member having an eccentrically shaped peripheral configuration relative to an axis of rotation.

5. Container handling apparatus including a constantly moving first conveyor having a fixed path and providing pocket means to receive a plurality of containers, a constantly moving second conveyor having a fixed path directed to pass adjacent to and athwart said first conveyor to support the plurality of containers in said pocket means, means feeding containers seriatim onto said second conveyor, means adjacent said two conveyors to regulate the motion of the containers and to change the container movement from that of said second conveyor to that of said first conveyor, and container stabilizing means operatively disposed adjacent each said conveyor in position to regulate the rate of receipt of the containers into said pocket means, said stabilizing means comprising a fixed guide to engage containers near the bottoms and moving means to engage the containers above the bottoms, said moving means having substantially the same movement as said first conveyor.

6. In container handling apparatus for passing groups of containers from one conveyor to another, the improvement: of a first conveyor having a plurality of side open pockets and movable at substantially uniform speed; a second conveyor having a horizontally movable flat top surface on which the containers are supported, said second conveyor constantly moving in a direction across said first conveyor with said flat top surface moving under said side open pockets; container injector means operatively mounted over said second conveyor and adjacent the path of travel of said side open pockets of said first conveyor, said injector means engaging the containers seriatim and timing the passage of a predetermined group of containers into each side open pocket; and guide means operatively disposed in the path of movement of both said conveyors and in position to engage the containers seriatim and change the direction of container movement from that of said second conveyor to that of said first conveyor.

7. The improvement of claim 6 wherein said injector means and said guide means are operated from a common power source and have a synchronized operation, and said injector means has a series of pockets locating the containers in groups for timed entry into said side open pockets assisted by said guide means.

8. The improvement of claim 6 wherein container stabilizing means is operatively mounted adjacent the path of travel of said first conveyor opposite the location of said injector means, said stabilizing means including a spiral element of variable diameter and having a pitch substantially equal to the spacing of said side open pockets.

9. The improvement of claim 6 wherein said guide means is a cam rotating on a vertical axis and having its lobe operative to pass over said flat top surface of said second conveyor and under said side open pockets of said first conveyor inwardly of the container entrance to said side open pockets, said cam lobe engaging the successive containers adjacent the bottoms and sliding the containers in the direction of movement of said first conveyor over said flat top surface.

References Cited

UNITED STATES PATENTS

| | | | |
|---|---|---|---|
| 1,281,581 | 10/1918 | Johnson | 198—22 |
| 2,511,534 | 6/1950 | Koppisch | 198—28 |
| 2,265,803 | 12/1941 | Davis | 198—22 XR |
| 2,609,911 | 9/1952 | Davis. | |
| 2,815,112 | 12/1957 | Engleson et al. | 198—30 |

FOREIGN PATENTS

| | | |
|---|---|---|
| 710,411 | 10/1956 | Germany. |
| 1,179,638 | 12/1958 | France. |

RICHARD E. AEGERTER, Primary Examiner

U.S. Cl. X.R.

198—31